M. Thode,
Constructing Walls.
Nº 79,028.   Patented June 16, 1868.
Fig: 1.
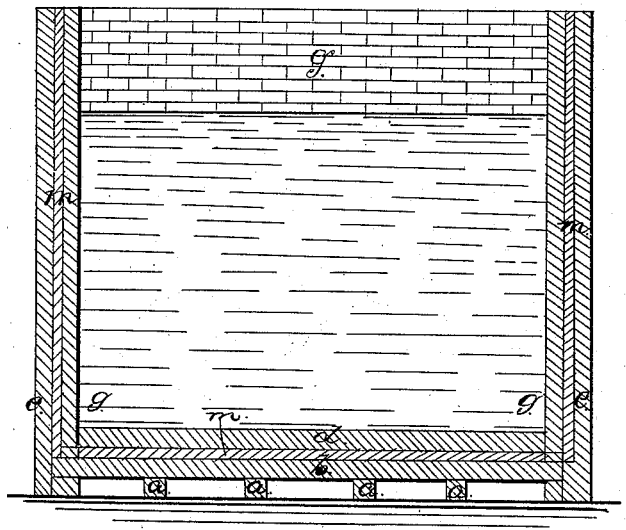
Fig: 2.
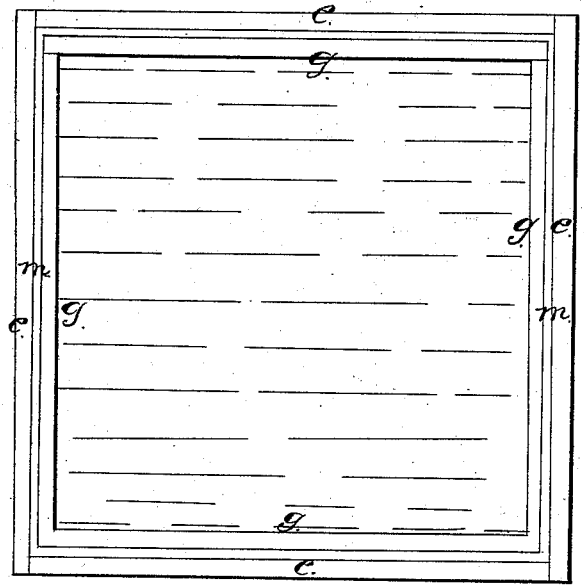
Witnesses:
W. C. Ashkettle
J. Fraser
Inventor:
M. Thode
per Munn & Co
Attorneys

United States Patent Office.

MARX THODE, OF MATTOON, ILLINOIS.

Letters Patent No. 79,028, dated June 16, 1868.

IMPROVEMENT IN SUBTERRANEAN WALLS.

*The Schedule referred to in these Letters Patent and making part of the same.*

TO ALL WHOM IT MAY CONCERN:

Be it known that I, MARX THODE, of Mattoon, in the county of Coles, and State of Illinois, have invented new and useful Improvements in Subterranean Walls; and I do hereby declare that the following is a full, clear, and exact description thereof, which will enable others skilled in the art to make and use the same, reference being had to the accompanying drawings forming part of this specification.

Figure 1 is a vertical section of a cylinder constructed according to my improvements.

Figure 2 is a horizontal section of the same.

Similar letters of reference indicate corresponding parts.

This invention consists in forming the walls of cisterns, cellars, or other subterranean structures in two parts, or double, with an interlining of pitch, asphaltum, or other equivalent resinous substances, by which means water or dampness is excluded.

The walls and floor are of brick or cement, and the manner of construction is as follows:

A floor, $b$, is first laid upon the wooden sleepers $a$, as shown. This floor may be of wood, or it may be of plank, laid first, and covered with brick.

The edges are bounded by a tier of brick or a wooden batten, and melted pitch, asphaltum, or other equivalent thereof, is poured upon the floor.

The exterior wall, $e$, and the inner wall, $g$, are then built up together, being filled with the pitch or asphaltum as the walls rise.

The exterior wall rests on its foundation outside of the floor $b$, but the inner wall rises from the said floor, as shown.

A bottom, $d$, of brick or cement is afterwards laid over the pitch, to protect it from injury or wear.

These improvements, when employed in the construction of cellars, will cause the same to be water-tight, and totally free from dampness in all seasons.

When cisterns are so constructed they will not leak nor permit the water within them to become impure from the percolation of exterior drainage.

I claim as new, and desire to secure by Letters Patent—

In the formation of subterranean structures, the employment of double walls $e\ g$, with the space between them filled with pitch, $m$, or asphaltum or other impervious material, to be melted and poured therein as the walls are built up; and a bottom, formed by the layers $b\ d$, with a layer of pitch or asphaltum $m$ between them, all constructed and arranged as described for the purpose specified.

MARX THODE.

Witnesses:
S. J. FISHER,
JOHN OWENS.